Dec. 1, 1931.  B. PETROWSKY  1,834,177
MOTION PICTURE PROJECTION SCREEN
Filed March 29, 1930  2 Sheets-Sheet 1
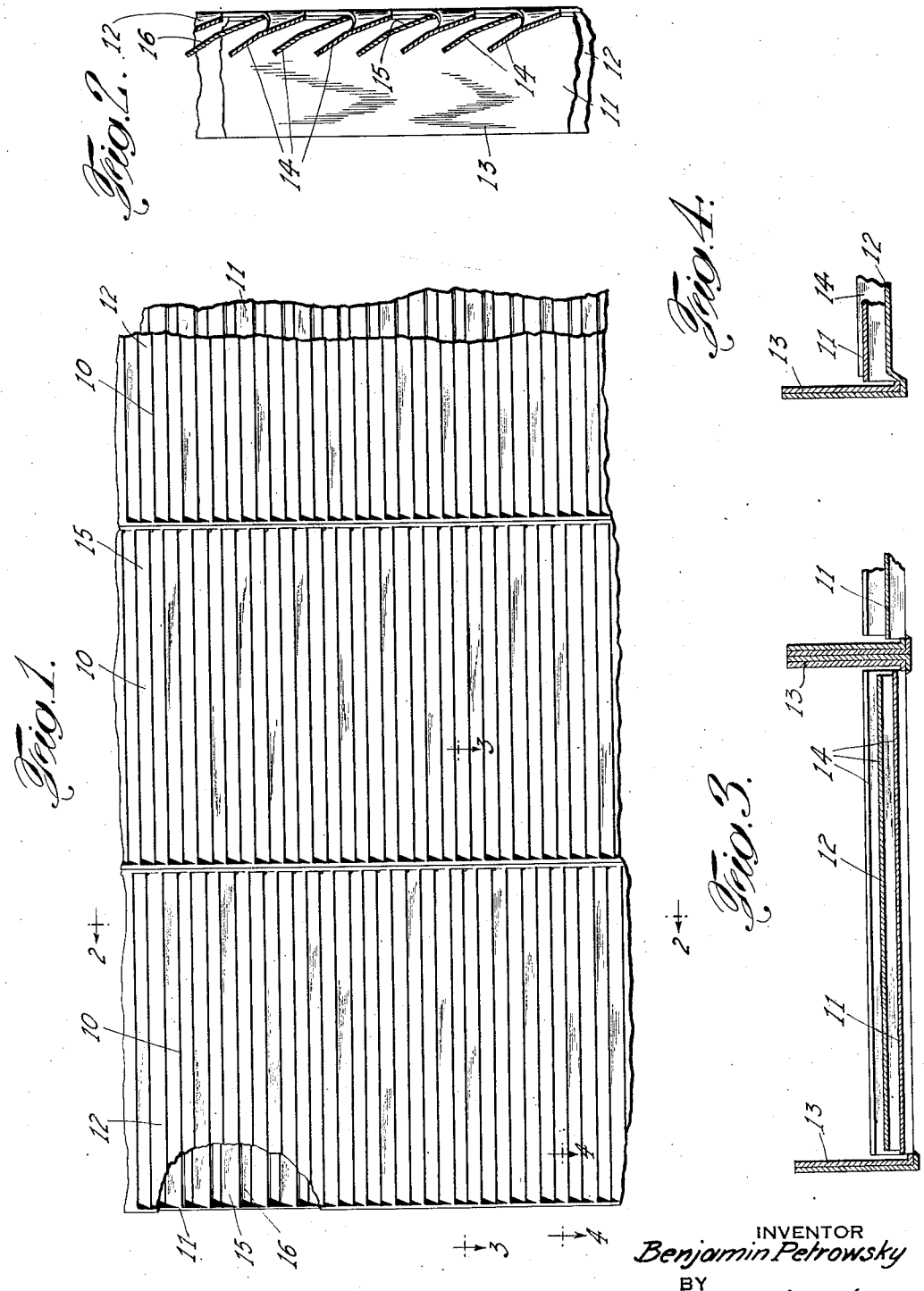
INVENTOR
Benjamin Petrowsky
BY
Howard W. Dix
ATTORNEY Dec. 1, 1931.  B. PETROWSKY  1,834,177
MOTION PICTURE PROJECTION SCREEN
Filed March 29, 1930  2 Sheets-Sheet 2
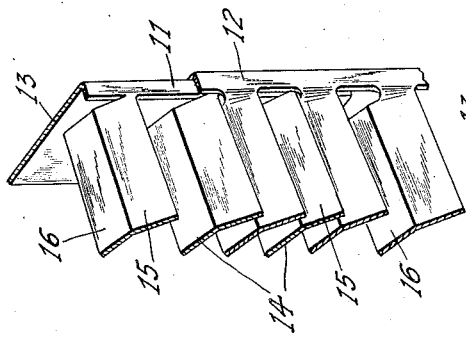
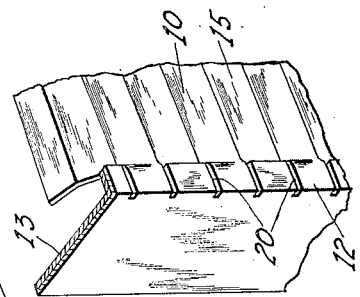
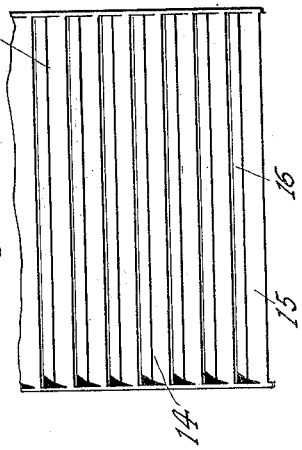
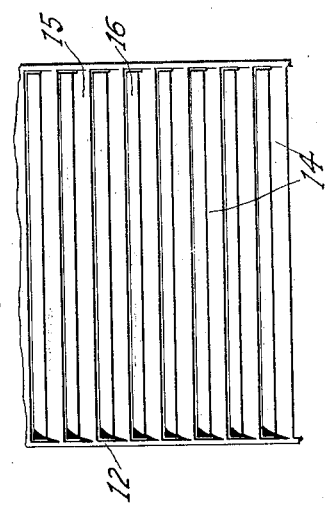
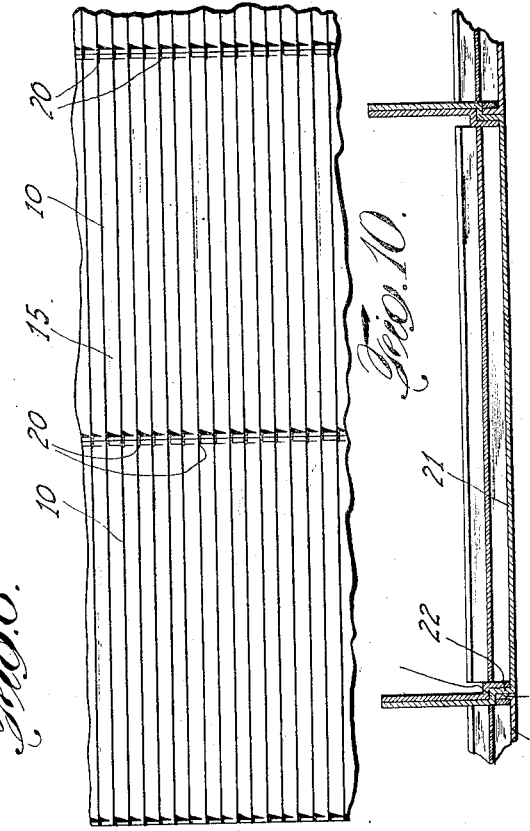
INVENTOR
Benjamin Petrowsky
BY
Howard W. Dix
ATTORNEY Patented Dec. 1, 1931

1,834,177

UNITED STATES PATENT OFFICE

BENJAMIN PETROWSKY, OF BROOKLYN, NEW YORK

MOTION PICTURE PROJECTION SCREEN

Application filed March 29, 1930. Serial No. 439,963.

This invention relates to motion picture apparatus, and more particularly to a screen adapted to receive a talking picture.

The invention provides a screen which has a surface suitable for receiving a picture and at the same time is transparent to sound waves, so that the loud speaker or other sound reproducing apparatus may be placed behind the screen for projecting the sound therethrough.

An object of the invention is to provide a screen of the above type which is simple to construct and assemble and which is both durable and efficient.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a front elevation of a portion of a screen constructed in accordance with the present invention;

Fig. 2 is a section taken on the line 2—2 of Fig. 1;

Fig. 3 is a section taken on the line 3—3 of Fig. 1;

Fig. 4 is a section taken on the line 4—4 of Fig. 1;

Figs. 5 and 6 are front elevations of the component parts of the screen;

Fig. 7 is an enlarged detail view showing the construction of the screen;

Fig. 8 is a front elevation of a portion of the modified form of screen;

Fig. 9 is an enlarged detail view showing the construction of the screen shown in Fig. 8; and Fig. 10 is an enlarged detail view of a further modified form of screen.

Like reference characters denote like parts in the several figures of the drawings.

In the following description and in the claims parts will be identified by specific names for convenience, but they are intended to be as generic in their application to similar parts as the art will permit.

Referring to the drawings more in detail the screen is shown as formed of a plurality of sections 10 (Fig. 1) which are formed in a similar manner and held in abutting relationship by any convenient means, such as solder.

Each of the sections comprise an inner member 11 and an outer member 12 which are formed in a similar manner. Said members are provided with side flanges which are disposed at an angle to the face of the screen and provide the cooperating surfaces by which adjacent sections are secured together. The face of members 11 and 12 are formed of a plurality of vanes 14, shown in detail in Fig. 7, which are stamped out of said members. Each of said vanes is formed with a light receiving surface 15 which is inclined to the face of the screen and with blade 16 which is angularly disposed with respect to surface 15 and is adapted to be interleaved between adjacent vanes of the complementary member.

After members 11 and 12 are stamped out to produce the vanes, they are interleaved in such manner that blades 16 of one member lie between blades 16 of the other member. In this position the light receiving surfaces slightly overlap, so that a complete screen surface is presented. Vanes 14, however, are offset a sufficient amount to permit passage of sound therebetween.

Each of the sections 10 is formed from a pair of members 11 and 12 which are assembled in the manner above pointed out with flanges in contact. These flanges are then secured together for producing a unitary construction and also are used for securing the assembled section to the next adjacent section. It is obvious that a complete screen may be made up of any desired number of sections 10 and the size of said sections may be varied to secure the best optical and sound transmission effects.

It is to be noted that the vanes of the different sections 10 (shown in Fig. 1) are mounted in staggered relationship. This may be preferable to prevent the line representing the edge of the vane from extending unbroken entirely across the face of the screen. In certain instances such an unbroken line might be visible to persons in the audience if they are extended a sufficient distance across the face of the screen.

In certain instances it may be desirable to break up the vertical line formed between adjacent sections 10. This may be accomplished as shown in Figs. 8 and 9 by mounting the various units 10 with the edges of the various vanes in aligned position and forming a plurality of notches 20 in the face of said units and in alignment with the edges of said vanes. These notches effectively break up the continuous vertical line between adjacent sections and form a continuous horizontal line across the face of the screen. Such a construction will be desirable in cases where the vertical line is more prominent than the horizontal line caused by the edges of the vanes.

In the modified form of screen shown in Fig. 10, one of the screen sections 21 is shown as provided with a flange 22 which is angularly bent to form a shoulder 23. The adjacent screen section 24 is provided with a short inturned flange 25 which seats within shoulder 23 and may be secured thereto by any convenient means, such as solder. In this form of the invention it will be noted that the flange is eliminated from one of the screen sections and a positive seat is formed in the other section for receiving the same. A screen constructed in this manner would be formed with alternate sections having flanges 22 which are provided with shoulders as above described, and the other sections being provided with short flanges 25 which are seated in said shoulders.

The screen has been described as constructed with a plurality of sections 10 which extend in a vertical direction. It is obvious, however, that the sections may extend in any other direction, such as horizontally, without departing from the present invention. In certain instances it has been found desirable to mount the screen in such manner that blades 16 extend downwardly. This permits the amount of overlap between the vanes to be reduced while still maintaining an apparent overlap from all parts of the audience, the absence of which would produce dark lines across the face of the picture.

The above described screen may be formed of any suitable material, such as thin sheet metal, the face of which may be coated with the necessary light receiving material. The screen formed in this manner is particularly durable and may be conveniently mounted for intermittent use in a theatre. The metal surface may be readily cleaned without danger of injuring the material or deranging the parts. A sound passage is provided through the entire range of the screen, so that the sound apparatus may be located in any convenient position, or a plurality of sound propagating devices may be disposed at different points behind the screen. At the same time a continuous surface is present for the reception of pictures.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. A picture screen comprising a plurality of vanes having inclined light receiving surfaces and depending blades angularly disposed with respect thereto, said light receiving surfaces being mounted in overlapping position with respect to all parts of the audience.

2. In a picture screen comprising a plurality of sections, each of which is formed of a pair of members having depending flanges by which said members and said sections are secured together, each of said members being provided with a plurality of inclined vanes having light receiving surfaces, the vanes of said members being interleaved to provide an apparent, continuous light receiving surface, said vanes being spaced to permit passage of sound waves therethrough, the vanes of the several sections being mounted in staggered relationship.

3. In a picture screen comprising a plurality of sections, each of which is formed of a pair of members having depending flanges by which said members and said sections are secured together, each of said members being provided with a plurality of inclined vanes having light receiving surfaces, the vanes of said members being interleaved to provide an apparent, continuous light receiving surface, said vanes being spaced to permit passage of sound waves therethrough, the vanes of the several sections being mounted in aligned position, said sections having grooves formed on the face thereof in alignment with the edges of said vanes to provide an apparent, continuous line across the face of the screen.

4. A picture screen comprising a plurality of vanes having light receiving surfaces and depending blades angularly disposed with respect thereto, said vanes being mounted with spaces therebetween to permit passage of sound and with said blades overlapping said spaces to present an apparently continuous light receiving surface and to permit unobstructed passage of sound therethrough.

In testimony whereof I have hereunto set my hand.

BENJAMIN PETROWSKY.